United States Patent
Zhang et al.

(10) Patent No.: US 10,702,857 B2
(45) Date of Patent: Jul. 7, 2020

(54) MONATOMIC METAL-DOPED FEW-LAYER MOLYBDENUM DISULFIDE ELECTROCATALYTIC MATERIAL, PREPARING METHOD THEREOF, AND METHOD FOR ELECTROCATALYTIC NITROGEN FIXATION

(71) Applicant: CENTRAL CHINA NORMAL UNIVERSITY, Hubei (CN)

(72) Inventors: Lizhi Zhang, Hubei (CN); Fengjiao Quan, Hubei (CN); Shang Chen, Hubei (CN); Falong Jia, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 139 days.

(21) Appl. No.: 15/972,224

(22) Filed: May 6, 2018

(65) Prior Publication Data
US 2019/0030516 A1    Jan. 31, 2019

(30) Foreign Application Priority Data
Jul. 25, 2017 (CN) .......................... 2017 1 0610633

(51) Int. Cl.
*B01J 27/051* (2006.01)
*B01J 35/02* (2006.01)
(Continued)

(52) U.S. Cl.
CPC ......... *B01J 27/0515* (2013.01); *B01J 27/051* (2013.01); *B01J 35/002* (2013.01);
(Continued)

(58) Field of Classification Search
CPC .... B01J 27/0515; B01J 27/051; B01J 35/002; B01J 35/0033; B01J 35/006; B01J 35/023;
(Continued)

(56) References Cited

U.S. PATENT DOCUMENTS

| | | | | |
|---|---|---|---|---|
| 2013/0068613 A1* | 3/2013 | Hu | .......................... | B01J 27/047 204/290.13 |
| 2018/0258117 A1* | 9/2018 | O'Brien | .................. | C07F 7/003 |

FOREIGN PATENT DOCUMENTS

| | | | | |
|---|---|---|---|---|
| CN | 10 6086919 | * | 11/2016 | ............. B82Y 40/00 |
| CN | 10 6319559 | * | 1/2017 | ............... C25B 1/04 |
| CN | 10 6092861 | * | 11/2019 | ............. G01N 15/10 |

OTHER PUBLICATIONS

Dongzhi Zhang et al., "Room-temperature SO2 gas-sensing properties based on a metal-doped MoS2 nanflower: an experimental and density functional theory investigation." Journal of Materials Chemistry A, 5, pp. 20666-20677. (Year: 2017).*

(Continued)

*Primary Examiner* — Patricia L. Hailey
(74) *Attorney, Agent, or Firm* — JCIPRNET (57) ABSTRACT

The present invention provides a monatomic metal-doped few-layer molybdenum disulfide electrocatalytic material, a preparing method thereof, and a method for electrocatalytic nitrogen fixation. The material has a few-layer ultra-thin and irregular flake-like microstructure with a length and a width of nanometer scale. A doping metal in the monatomic metal-doped few-layer molybdenum disulfide electrocatalytic material is dispersed in a form of single atoms. When the catalyst is used in electrochemical reduction of $N_2$, a Faradic efficiency in selective reduction of $N_2$ into $NH_4^+$ is 18% or above, and stability of the catalyst is better.

9 Claims, 8 Drawing Sheets

(51) Int. Cl.
B01J 35/00 (2006.01)
B01J 37/34 (2006.01)
B01J 37/10 (2006.01)
C01G 39/06 (2006.01)

(52) U.S. Cl.
CPC ........... B01J 35/006 (2013.01); B01J 35/008 (2013.01); B01J 35/0033 (2013.01); B01J 35/023 (2013.01); B01J 35/026 (2013.01); B01J 37/10 (2013.01); B01J 37/343 (2013.01); C01G 39/06 (2013.01); B01J 2523/68 (2013.01); B01J 2523/82 (2013.01); B01J 2523/84 (2013.01); C01P 2002/54 (2013.01); C01P 2002/72 (2013.01); C01P 2002/85 (2013.01); C01P 2004/03 (2013.01); C01P 2004/04 (2013.01); C01P 2004/24 (2013.01)

(58) Field of Classification Search
CPC .......... B01J 35/026; B01J 37/10; B01J 37/43; C01G 39/06
USPC ................................ 502/220–223, 303, 313
See application file for complete search history.

(56) References Cited

OTHER PUBLICATIONS

Sizhe Yang et al., "Magnetic control of single transition metal doped MoS2 through H/F chemical decoration." Journal of Magnetism and Magnetic Materials 422, pp. 243-248. (Year: 2017).*

Lun Yang et al., "Amorphous nickel/cobalt tungsten sulfide electrocatalysts for high-efficiency hydrogen evolution reaction." Applied Surface Science 341, pp. 149-156. (Year: 2015).*

Jingxuan Wang et al., "Adsorption of H2O molecule on TM (Au, Ag) doped-MoS2 monolayer: A first-principles study." Physica E: Low-dimensional Systems and Nanostructures 113, pp. 72-78. (Year: 2019).*

Dongwei Ma et al., "The adsorption of CO and NO on the MoS2 monolayer doped with Au, Pt, Pd, or Ni: A first-principles study." Applied Surface Science 383, pp. 98-105. (Year: 2016).*

Ruitao Lv et al., "Two-dimensional transition metal dichalcogenides: Clusters, ribbons, sheets and more." Nano Today 10, pp. 559-592. (Year: 2015).*

Ke-Jing Huang et al., "Molybdenum disulfide nanoflower-chitosan-Au nanoparticles composites based electrochemical sensing platform for bisphenol A determination." Journal of Hazardous Materials 276, pp. 207-215. (Year: 2014).*

Yuehua Fan et al., "A DFT study of transition metal (Fe, Co, Ni, Cu, Ag, Au, Rh, Pd, Pt and Ir)-embedded monolayer MoS2 for gas adsorption." Computational Materials Science 138, pp. 255-266. (Year: 2017).*

Zhenping Chen et al., "Strain control of the electronic structures, magnetic states, and magnetic anisotropy of Fe doped single-layer MoS2." Computational Materials Science 110, pp. 102-108. (Year: 2015).*

Hung-Chang Hsu, et al., "Surface morphology, magnetism and chemical state of Fe coverage on MoS2 substrate," Applied Surface Science, vol. 357, Sep. 2015, pp. 551-557.

Luis Miguel Azofra, et al., "Feasibility of N2 Binding and Reduction to Ammonia on Fe-Deposited MoS2 2D Sheets: A DFT Study," Chemistry—A European Journal, vol. 23, May 2017, pp. 8275-8279.

* cited by examiner

MONATOMIC METAL-DOPED FEW-LAYER MOLYBDENUM DISULFIDE ELECTROCATALYTIC MATERIAL, PREPARING METHOD THEREOF, AND METHOD FOR ELECTROCATALYTIC NITROGEN FIXATION

CROSS-REFERENCE TO RELATED APPLICATION

This application claims the priority benefit of China application serial no. 201710610633.8, filed on Jul. 25, 2017. The entirety of the above-mentioned patent application is hereby incorporated by reference herein and made a part of this specification.

BACKGROUND OF THE INVENTION

1. Field of the Invention

The present invention relates to the technical field of catalysis, and specifically, to a monatomic metal-doped few-layer molybdenum disulfide electrocatalytic material, a preparing method thereof, and a method for electrocatalytic nitrogen fixation.

2. Description of Related Art

During photosynthesis of plants, sunlight is absorbed to convert carbon dioxide ($CO_2$) in the air into a carbohydrate, and biological nitrogen fixation is a process in which free nitrogen ($N_2$) in the air is converted into ammonia ($NH_3$/$NH_4^+$) by nitrogen fixation microorganisms in the soil and water body. Although a content of the $N_2$ in the air is as high as 78%, it cannot directly participate in the metabolic reactions in a vast majority of organisms due to the chemical inertness of free $N_2$ (high dissociation energy of nonpolar N≡N bond, strong ionization potential and weak proton affinity). As the world population grows and available cultivated land declines, the demand for nitrogen fertilizers in agriculture grows increasingly. Most nitrogen fixation microorganisms are unable to achieve controllable nitrogen fixation with respect to food crops. Therefore, there is an urgent need to develop effective approaches to artificial nitrogen fixation. In 1903, German scientist Fritz Haber initially reported that by means of the Haber-Bosch reaction involving $H_2$, desorption-adsorption and efficient nitrogen fixation of surface $N_2$ are achieved. At present, up to 220 million tons of ammonia are produced through the Haber-Bosch reaction in the whole world, which is the chemical of the second largest production, and of which 85% is used as a fertilizer. One-third of the protein in human food is derived from industrial ammonia. However, a high conversion efficiency can be achieved with the Haber-Bosch reaction only at a relatively high temperature (300-550° C.). To shift the reaction equilibrium towards $NH_3$ generation, the Haber-Bosch reaction also needs to be carried out under a high pressure (15-25 MPa). As a result, the energy consumption of the entire Haber-Bosch reaction is high, which consumes about 1.1% of the fossil fuels each year and releases a large amount of greenhouse gases. It is imminent to break through the harsh Haber-Bosch reaction conditions, and to develop a new method for artificial nitrogen fixation in industry.

In recent years, electrocatalytic nitrogen fixation is a relatively new direction of research. In the electrocatalytic reduction of $N_2$, renewable energy is used to generate electric energy, and then the energy is transferred and stored in important chemical and energy materials such as $NH_4^+$ and hydrazine. Electrocatalytic reduction of $N_2$ is not only environmentally friendly and low in energy consumption, but also has the following three advantages: (1) the electroreduction reaction can be carried out under mild conditions with no need of high temperature and pressure; (2) a higher energy utilization efficiency can be achieved with the electrochemical device, compared with other chemical conversion devices; and (3) the surface free energy of the catalyst can be directly controlled by the electrode potential, making it possible to control the reaction rate and the selectivity to product. However, the electrocatalytic reduction of $N_2$ also has disadvantages; (1) the Faradic efficiency is relatively low; (2) most of the reactions need to be carried out in acidic or alkaline electrolytes; and (3) the catalyst life is short, and prone to deactivation. Therefore, it is urgent to develop a new and efficient catalyst for electrocatalytic nitrogen fixation that can be effectively used for a long time under neutral conditions.

Therefore, the development of a catalyst and method that can efficiently electrocatalytically reduce $N_2$ is of great significance for the environment protection and energy saving and can reduce the production costs, thus having great commercial prospect.

SUMMARY OF THE INVENTION

Accordingly, the present invention provides a monatomic metal-doped few-layer molybdenum disulfide electrocatalytic material, a preparing method thereof, and a method for electrocatalytic nitrogen fixation.

To resolve the above technical problems, the following technical solutions are adopted in the present invention.

A monatomic metal-doped few-layer molybdenum disulfide electrocatalytic material is provided. The monatomic metal-doped few-layer molybdenum disulfide electrocatalytic material has a few-layer ultra-thin and irregular flake-like microstructure with a length and a width of nanometer scale, and wherein the doping metal in a monatomic metal-doped few-layer molybdenum disulfide electrocatalytic material is dispersed in a form of single atoms.

In accordance with the above solution, the monatomic metal in the monatomic metal-doped few-layer molybdenum disulfide electrocatalytic material is for non-substitute doping, and the few-layer ultra-thin and irregular flake has a length and width of 50-200 nm and a thickness of 0.5-3 nm and 1-4 layers on average.

In accordance with the above solution, the monatomic metal, comprises, but is not limited to, iron, ruthenium, platinum, palladium, and lanthanum, and the doped amount is 0.2%-3%.

A method for preparing the monatomic metal-doped few-layer molybdenum disulfide electrocatalytic material comprises the following steps:

1) performing an ultrasonic process to flower-ball-shaped molybdenum disulfide to carry out an exfoliation, to obtain a few-layer molybdenum disulfide solution;

2) adding a nitrate hydrate of the metal to be doped to the few-layer molybdenum disulfide solution, mixing the few-layer molybdenum disulfide solution and the nitrate hydrate fully and uniformly by stirring, hydrothermally reacting for 10-12 h at 180-220° C., naturally cooling a reactor to room temperature after the reaction is completed, carrying out a post-treatment, and collecting a reaction product; and 3) ultrasonicating, centrifuging, and drying the reaction product to obtain a monatomic metal-doped few-layer molybdenum disulfide.

In accordance with the above solution, in the step 2), a molar ratio of the nitrate hydrate of the metal to be doped, based on the metal to be doped, relative to molybdenum disulfide is 0.5%-5%, and preferably 0.5%-3%.

In accordance with the above solution, the ultrasonication time in the step 1) is 15-20 min.

In accordance with the above solution, the post-treatment in the step 2) comprise: collecting the solid reaction product by centrifugation, washing 3 times each with dilute hydrochloric acid, distilled water, and anhydrous ethanol, collecting the washed solid product by centrifugation, and drying.

In accordance with the above solution, the centrifuging in the step 3) comprises: centrifuging for 5-10 min at a low rotation speed of 3000-5000 r/min to collect a supernatant; and centrifuging the supernatant for 5-10 min at a high rotation speed of 10000-15000 r/min.

In accordance with the above solution, the flower-ball-shaped molybdenum disulfide can be prepared by the following method: adding 1-1.5 g of ammonium molybdate tetrahydrate and 1.5-2 g of thiourea sequentially to 40-60 mL of distilled water at room temperature, mixing until uniform by stirring, hydrothermally reacting at a controlled temperature of 180-220° C. for a controlled time period of 20-28 h, and performing the post-treatment after the reaction is completed, to obtain the flower-ball-shaped molybdenum disulfide.

A method of using the monatomic metal-doped few-layer molybdenum disulfide electrocatalytic material in electrocatalytic nitrogen fixation is provided. The method of using specifically comprises: in an electrolytic cell comprising an anode tank and a cathode tank separated by a proton exchange membrane, using a monatomic metal-doped few-layer molybdenum disulfide catalyst electrode as a working electrode (cathode), using a platinum plate as an auxiliary electrode (anode), and using a saturated calomel electrode as a reference electrode; respectively charging an electrolyte solution to the electrolytic cells of the anode tank and the cathode tank; introducing $N_2$ into the cathode tank until saturation; and then reducing the $N_2$ at a constant potential of −0.36-0.04 V while introducing the $N_2$ continuously.

In accordance with the above solution, an anolyte solution is a 0.05-0.2 M potassium sulfate solution, and a catholyte solution is a 0.05-0.2 M potassium chloride solution.

In accordance with the above solution, a method for preparing the monatomic metal-doped few-layer molybdenum disulfide catalyst electrode comprises weighing the monatomic metal-doped few-layer molybdenum disulfide, ultrasonically dispersing in a mixed solution of Nafion and isopropanol, then dripping the suspension of the metal-doped few-layer molybdenum disulfide onto the surface of a glassy carbon electrode, and drying under an infrared light, to prepare a monatomic metal-doped few-layer molybdenum disulfide/glassy carbon electrode.

In accordance with the above solution, 5-10 mg of the monatomic metal-doped few-layer molybdenum disulfide is ultrasonically dispersed in 0.5-1 mL of the mixed solution of Nafion and isopropanol.

In accordance with the above solution, a load of the catalyst in the monatomic metal-doped few-layer molybdenum disulfide catalyst electrode is 1-2 mg/cm$^2$.

The present invention has the following advantages.

1. In the present invention, an efficient catalyst for electrocatalytic nitrogen fixation is successfully prepared by subtly combining a two-dimensional few-layer material with single atoms, which can efficiently electro-catalyze the nitrogen fixation under neutral conditions for a long time, wherein the Faradaic efficiency in electrocatalytic reduction of nitrogen to $NH_4^+$ with lanthanum doped few-layer molybdenum disulfide is up to 18%. This makes the industrialization of electrocatalytic nitrogen fixation feasible.

2. The catalyst of the present invention has the advantages of low cost, green, readily available raw materials, easy synthesis conditions, simple device, simple operation, and no need of professional personnel to operate.

3. In the monatomic metal-doped few-layer molybdenum disulfide electrocatalytic material of the present invention, the metal-doping is surface doping, instead of substitute doping, and the doped amount of the metal is low, thus reducing the costs and enhancing the economic benefits of the material.

4. The material is environmentally friendly, causes no secondary pollution, and can be recycled to some extent.

DESCRIPTION OF THE EMBODIMENTS

Example 1

Preparation of Iron-Doped Few-Layer Molybdenum Disulfide Material and Electrocatalytic Reduction of $N_2$.

Figure 2:
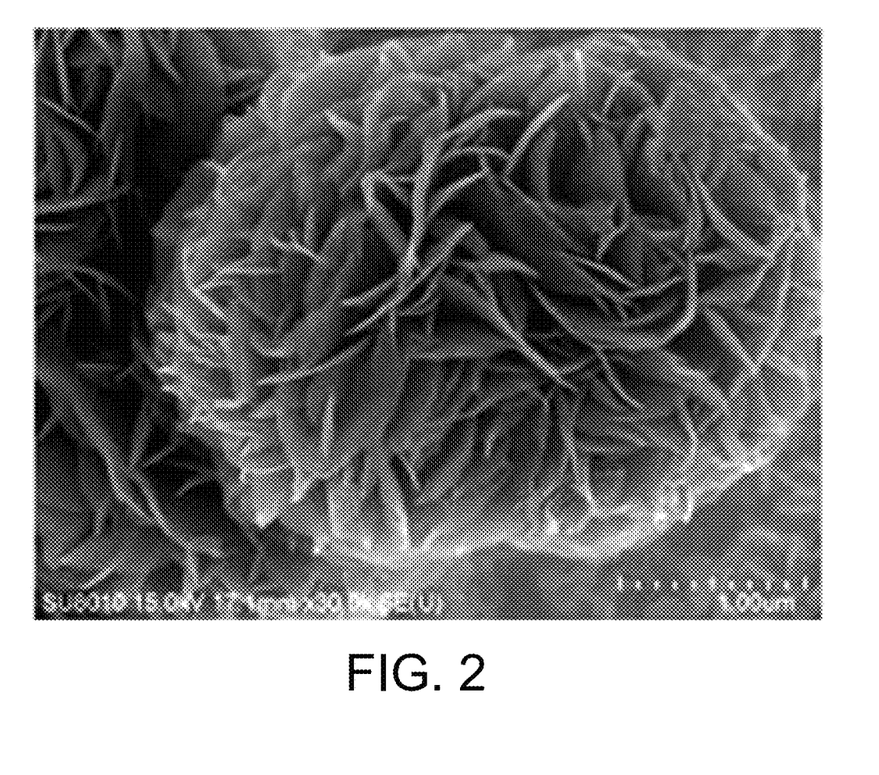
FIG. 2 is an SEM image of flower-ball-shaped molybdenum disulfide synthesized in Example 1.

At room temperature, 1.236 g of ammonium molybdate tetrahydrate and 1.824 g of thiourea were sequentially added to 50 mL of distilled water and mixed uniformly by stirring for 30 min. The mixed solution was transferred to an 80 mL PTFE liner, and then the liner was placed in a reactor and heated in a constant temperature oven. The reaction temperature and time were controlled to 200° C. and 24 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C., to obtain a flower-ball-shaped molybdenum disulfide. The SEM image is shown in FIG. 2. FIG. 2 shows that the molybdenum disulfide has a flower-ball-shaped structure consisting of flakes.

0.1 g of the flower-ball-shaped molybdenum disulfide was added to 50 ml of distilled water, and an ultrasonic process is performed to the flower-ball-shaped molybdenum disulfide for 20 min to carry out an exfoliation.

Ferric nitrate hydrate ($Fe(NO_3)_3 \cdot 9H_2O$) was added to the solution obtained above, wherein the molar ratio of iron relative to molybdenum disulfide was controlled to 1%. Stirring with a magnetic stirrer was continued for 1 h, such that the iron added was fully mixed with molybdenum disulfide.

The mixed solution thus obtained was transferred to an 80 mL PTFE liner, and then the liner was placed in a reactor and heated in a constant temperature oven. The reaction temperature and time were controlled to 200° C. and 12 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C.

The ultrasonicated suspension was centrifuged as follows. The ultrasonicated suspension was initially centrifuged for 10 min at a low rotation speed of 5000 r/min, to obtain a supernatant. Then, the supernatant was centrifuged for 5 min at a high rotation speed of 15000 r/min, to collect the solid, which was then dried in a vacuum oven at 80° C., to obtain the iron-doped few-layer molybdenum disulfide.

Figure 1:
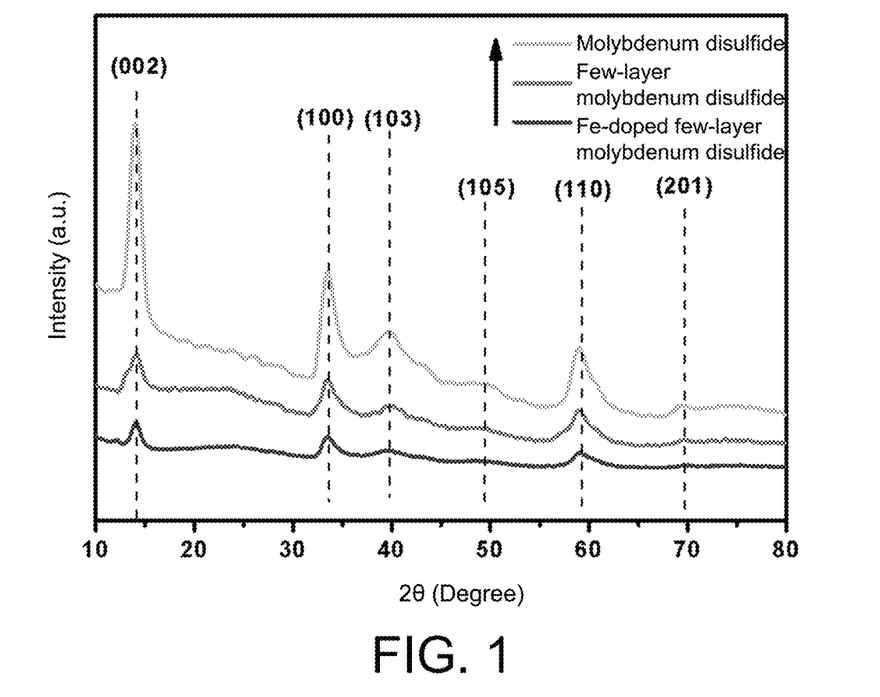
FIG. 1 is an XRD pattern of iron-doped few-layer molybdenum disulfide obtained in Example 1, showing that a main component in a synthesized material is molybdenum disulfide.

FIG. 1 is an XRD pattern of the iron-doped few-layer molybdenum disulfide, showing that a main component in the synthesized material is molybdenum disulfide.

Figure 3A:
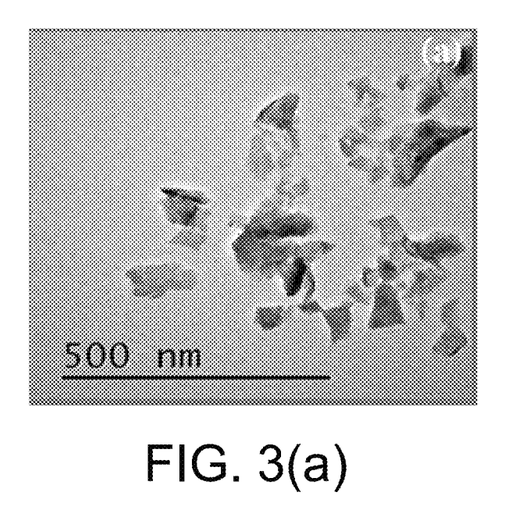
FIG. 3(a) is TEM image of the iron-doped few-layer molybdenum disulfide.
Figure 3B:
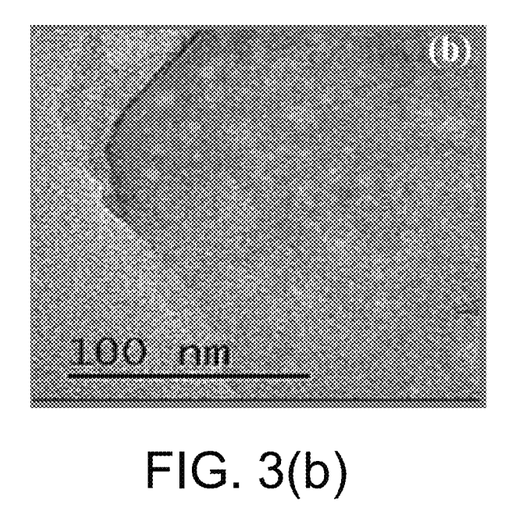
FIG. 3(b) is TEM image of the iron-doped few-layer molybdenum disulfide.
Figure 3C:
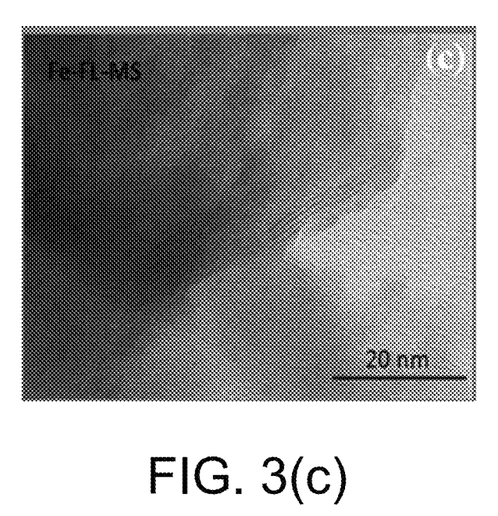
FIG. 3(c) is TEM image of the iron-doped few-layer molybdenum disulfide.
Figure 3D:
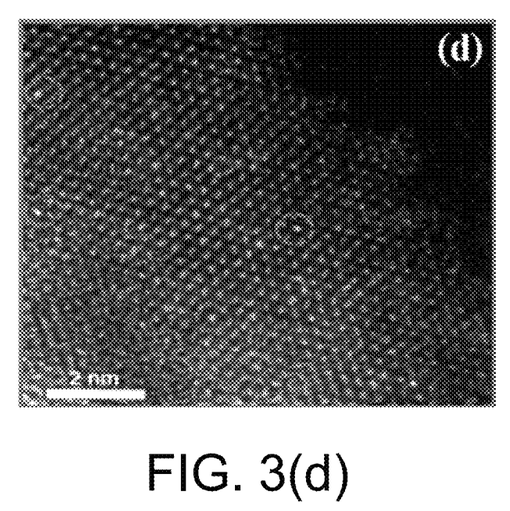
FIG. 3(d) is HAADF-STEM image of the iron-doped few-layer molybdenum disulfide.
Figure 3E:
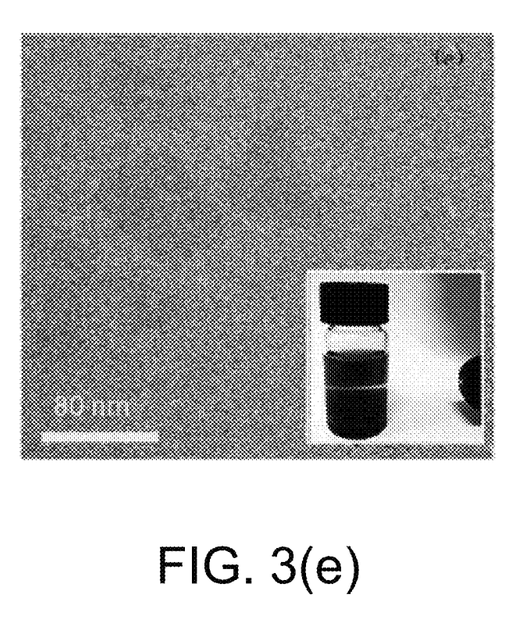
FIG. 3(e) is TEM image of the iron-doped few-layer molybdenum disulfide.

FIG. 3(a) shows that the material has an ultra-thin and irregular flake-like microstructure with a length and a width that are both 50-200 nm, FIG. 3(b) shows that the thickness of the few-layer ultra-thin and irregular flake is 0.5-3 nm, and FIG. 3(c) shows that the material has 1-4 layers on average. Obviously, the HAADF-STEM image of FIG. 3(d) shows that Fe on the surface is dispersed in a form of single atoms that mostly exist at a position right above the underlying Mo, that is, a position central to three sulfur atoms on the surface layer, so non-substitute doping occurs. FIG. 3(e) is TEM image of iron-doped monolayer molybdenum disulfide.

Figure 4A:
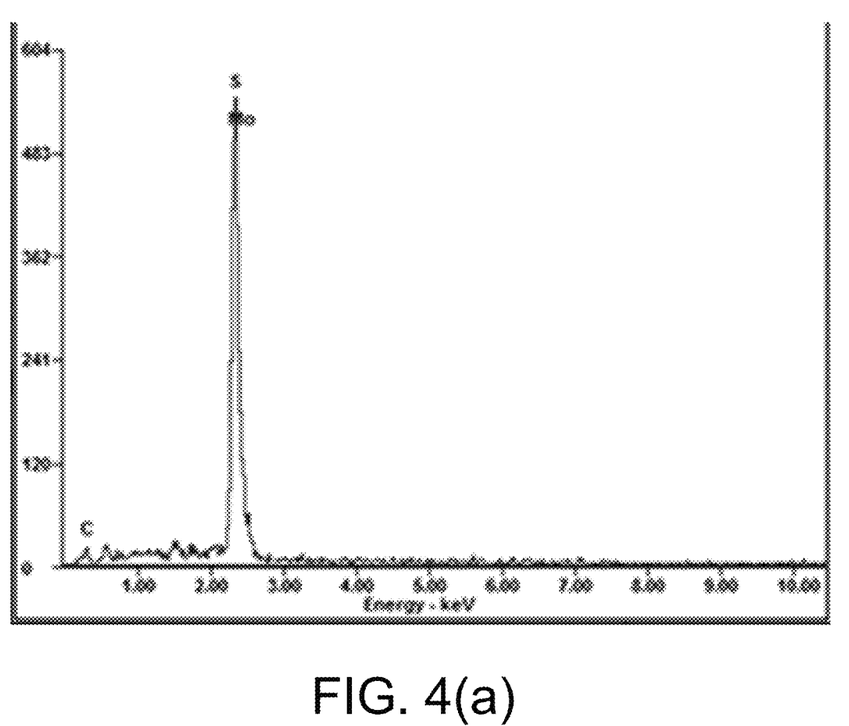
FIG. 4(a) is an EDS spectrum of the iron-doped few-layer molybdenum disulfide, showing that iron is definitely doped onto the molybdenum disulfide.

FIG. 4(a) is an EDS spectrum of the iron-doped few-layer molybdenum disulfide.

Figure 4B:
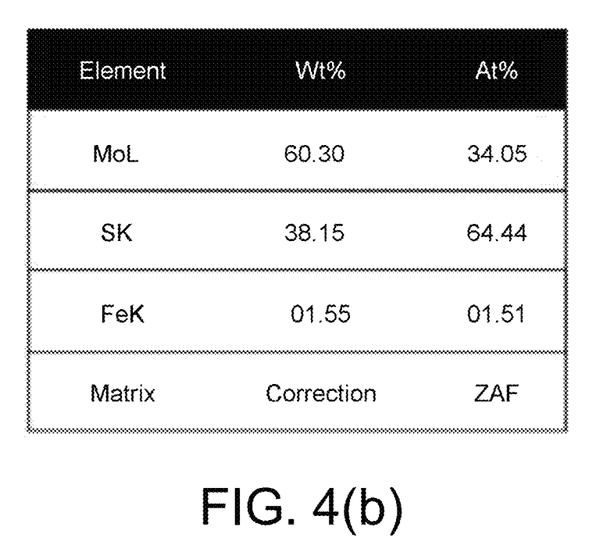
FIG. 4(b) is a table which shows the mass percentage and atomic percentage of each element present in the material.

FIG. 4(a) shows that iron is definitely doped onto the molybdenum disulfide, FIG. 4(b) is a table which shows the mass percentage and atomic percentage of each element present in the material.

Figure 5:
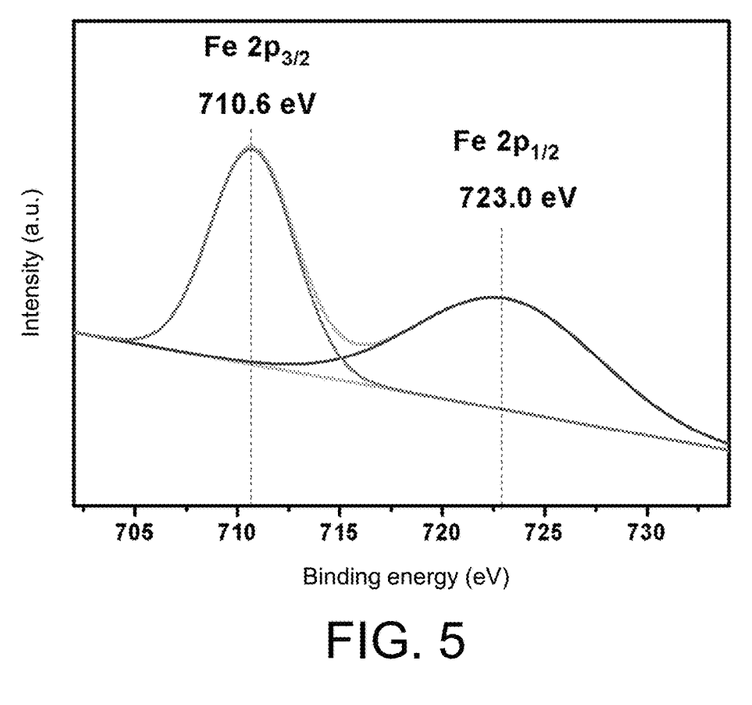
FIG. 5 is an XPS spectrum of the iron-doped few-layer molybdenum disulfide.

FIG. 5 is an XPS spectrum of the iron-doped few-layer molybdenum disulfide, showing that iron is doped onto the molybdenum disulfide.

10 mg of the iron-doped few-layer molybdenum disulfide was weighed as a precursor, and ultrasonically dispersed in 1 mL of a mixed solution of Nafion (2 wt %) and isopropanol. Then, 150 µL of the iron-doped few-layer molybdenum disulfide suspension was dripped onto the surface of a glassy carbon electrode with a surface area of 1 $cm^2$, and dried under infrared light, to prepare a Fe-FL-MS/GC electrode having a load of catalyst of 1.5 mg/$cm^2$.

In an electrolytic cell including an anode tank and a cathode tank separated by a proton exchange membrane, an iron-doped few-layer molybdenum disulfide catalyst electrode was used as a working electrode (cathode), a platinum plate was used as an auxiliary electrode (anode), and a saturated calomel electrode was used as a reference electrode; a 0.1 M potassium sulfate solution was used as an anolyte solution, and a 0.1 M potassium chloride solution was used as a catholyte solution; $N_2$ was bubbled into the cathode tank until saturation was reached; and the $N_2$ was then reduced into $NH_4^+$ at a constant potential of −0.16 V while the $N_2$ was introduced continuously, wherein the Faradic efficiency was 11.73%.

Figure 6:
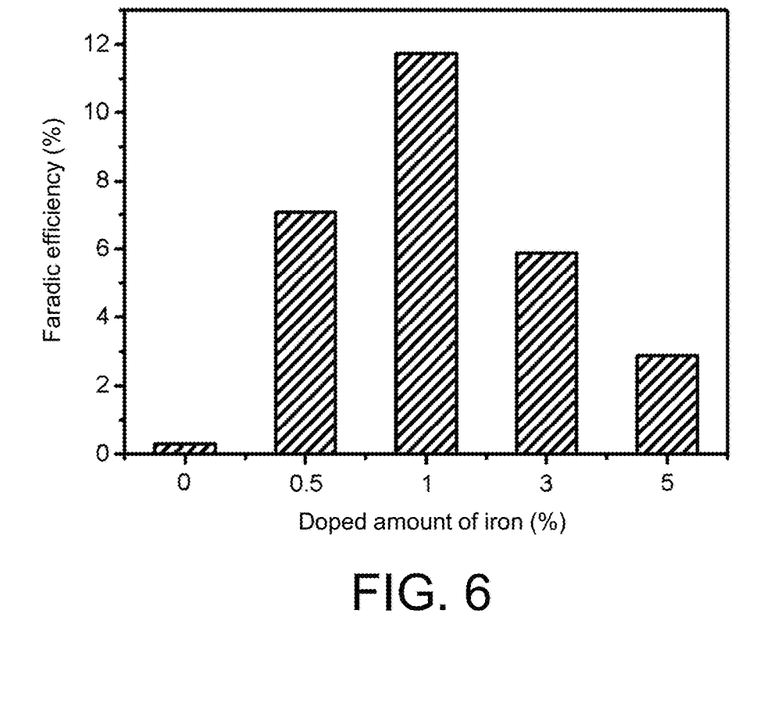
FIG. 6 compares the nitrogen fixation performances of few-layer molybdenum disulfide doped with different doped amounts of iron.

FIG. 6 compares the nitrogen fixation performances of few-layer molybdenum disulfide doped with different doped amounts of iron, wherein the doped amount is the doped amount of raw material.

Figure 7:
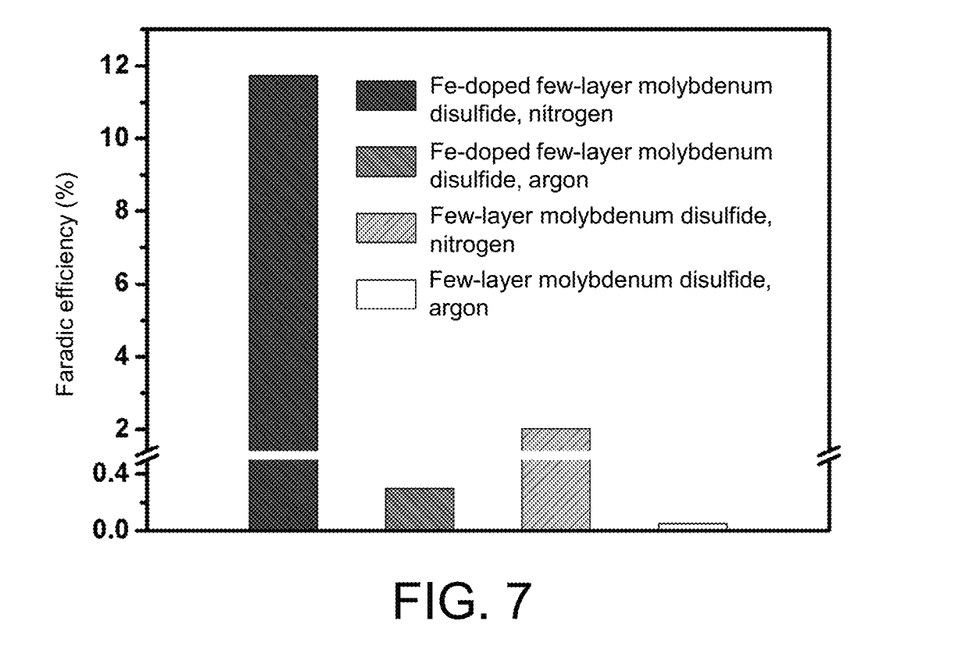
FIG. 7 shows the nitrogen fixation performances under different atmospheres of molybdenum disulfide and few-layer molybdenum disulfide doped with 1% iron.

FIG. 7 shows the nitrogen fixation performances under different atmospheres of few-layer molybdenum disulfide and few-layer molybdenum disulfide doped with 1% Fe at −0.16 V; and the argon atmosphere is realized by introducing argon into the electrolyte solution. Since the electrolyte solution has an amount of nitrogen dissolved therein, a trace amount of ammonia can be detected after electrolytic reduction. Except that the gas introduced into the electrolyte solution is replaced with nitrogen, the experimental conditions under the nitrogen and the argon atmosphere are basically the same.

Figure 8:
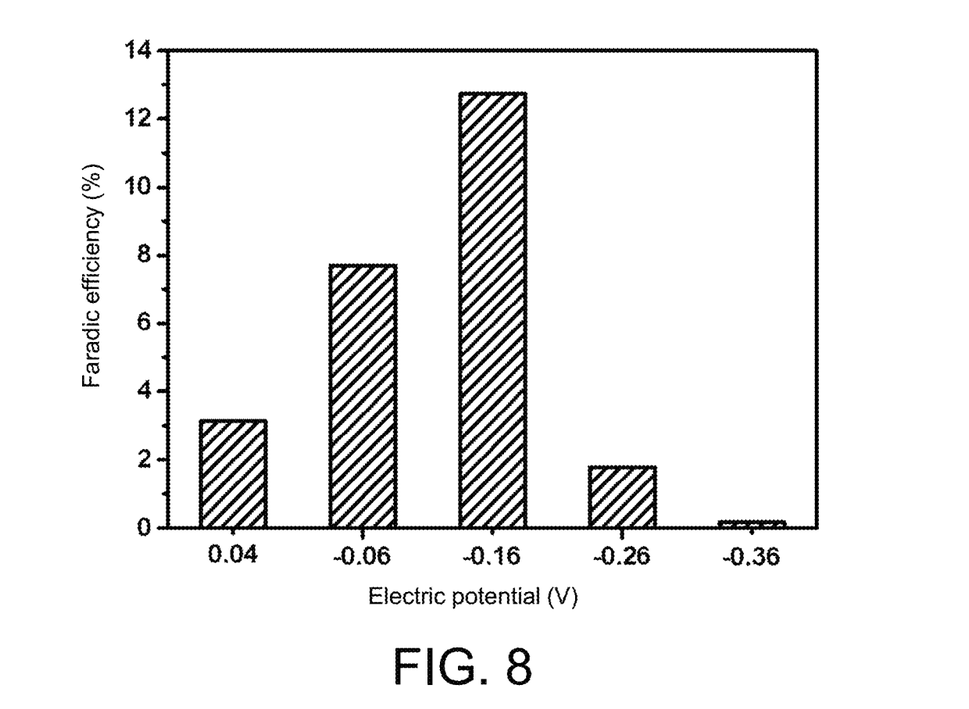
FIG. 8 shows the Faradic efficiencies in electrocatalytic reduction of $N_2$ to $NH_4^+$ with iron-doped few-layer molybdenum disulfide at various electric potentials.
Figure 9:
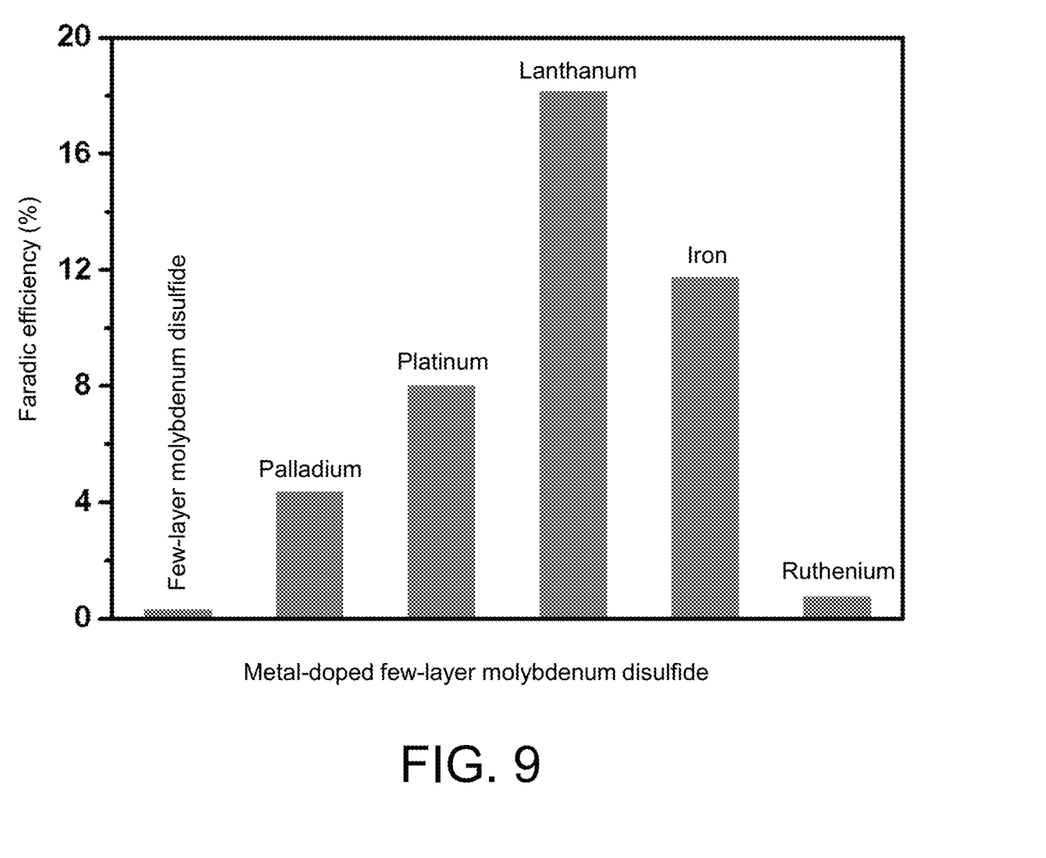
FIG. 9 shows the Faradic efficiencies obtained with few-layer molybdenum disulfide doped with different metals under the same reaction conditions.

FIG. 8 shows the Faradic efficiencies in electrocatalytic reduction of $N_2$ to $NH_4^+$ with iron-doped few-layer molybdenum disulfide at various electric potentials (−0.36-0.04 V). FIG. 8 shows that the optimum electric potential is −0.16 V (relative to standard hydrogen electrode).

Example 2

Preparation of Iron-Doped Few-Layer Molybdenum Disulfide Material and Electrocatalytic Reduction of $N_2$.

At room temperature, 1.236 g of ammonium molybdate tetrahydrate and 1.824 g of thiourea were sequentially added to 50 mL of distilled water and mixed uniformly by stirring for 30 min. The mixed solution was transferred to an 80 mL PTFE liner, and then the liner was placed in a reactor and heated in a constant temperature oven. The reaction temperature and time were controlled to 200° C. and 22 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C., to obtain a flower-ball-shaped molybdenum disulfide.

0.1 g of the flower-ball-shaped molybdenum disulfide was added to 50 ml of distilled water, and an ultrasonic process is performed to the flower-ball-shaped molybdenum disulfide for 20 min to carry out an exfoliation.

Ferric nitrate hydrate was added to the solution obtained above, wherein the molar ratio of iron relative to molybdenum disulfide was controlled to 1%. Stirring with a magnetic stirrer was continued for 1 h, such that the iron added was fully mixed with molybdenum disulfide.

The mixed solution thus obtained was transferred to an 80 mL PTFE liner, and then the liner was placed in a reactor and heated in a constant temperature oven. The reaction temperature and time were controlled to 200° C. and 10 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C.

The ultrasonicated suspension was centrifuged as follows. The ultrasonicated suspension was initially centrifuged for 8 min at a low rotation speed of 4000 r/min, to obtain a supernatant. Then, the supernatant was centrifuged for 5 min at a high rotation speed of 12000 r/min, to collect a solid, which was then dried in a vacuum oven at 80° C., to obtain an iron-doped few-layer molybdenum disulfide. As characterized by XRD, TEM, and HAADF-STEM, the material has an ultra-thin and irregular flake-like microstructure with a length and a width that are both 50-200 nm, the thickness of the few-layer ultra-thin and irregular flake is 0.5-3 nm, and the material has 1-4 layers on average over the thickness. Fe on the surface is dispersed in a form of single atoms that mostly exist at a position right above the underlying Mo, that is, a position central to three sulfur atoms on the surface layer, so non-substitute doping occurs.

10 mg of iron-doped few-layer molybdenum disulfide was weighed as a precursor, and ultrasonically dispersed in 1 mL of a mixed solution of Nafion (2 wt %) and isopropanol. Then, 200 μL of the iron-doped few-layer molybdenum disulfide suspension was dripped onto the surface of a glassy carbon electrode with a surface area of 1 cm$^2$, and dried under infrared light, to prepare a Fe-FL-MS/GC electrode having a load of catalyst of 2 mg/cm$^2$.

In an electrolytic cell including an anode tank and a cathode tank separated by a proton exchange membrane, an iron-doped few-layer molybdenum disulfide catalyst electrode was used as a working electrode (cathode), a platinum plate was used as an auxiliary electrode (anode), and a saturated calomel electrode was used as a reference electrode; a 0.1 M potassium sulfate solution was used as an anolyte solution, and a 0.1 M potassium chloride solution was used as a catholyte solution; $N_2$ was introduced into the cathode tank until saturation was reached; and the $N_2$ was then reduced into $NH_4^+$ at a constant potential of –0.16 V while the $N_2$ was introduced continuously, wherein the Faradic efficiency was 11.7%.

Example 3

Preparation of Iron-Doped Few-Layer Molybdenum Disulfide Material and Electrocatalytic Reduction of $N_2$.

At room temperature, 1.236 g of ammonium molybdate tetrahydrate and 1.824 g of thiourea were sequentially added to 50 mL of distilled water and mixed uniformly by stirring for 30 min. The mixed solution was transferred to an 80 mL PTFE liner, and then the liner was placed in a reactor and heated in a constant temperature oven. The reaction temperature and time were controlled to 180° C. and 24 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C., to obtain a flower-ball-shaped molybdenum disulfide.

0.1 g of the flower-ball-shaped molybdenum disulfide was added to 50 ml of distilled water, and an ultrasonic process is performed to the flower-ball-shaped molybdenum disulfide for 20 min to carry out an exfoliation.

Ferric nitrate hydrate was added to the solution obtained above, wherein the molar ratio of iron relative to molybdenum disulfide was controlled to 1%. Stirring with a magnetic stirrer was continued for 1 h, such that the iron added was fully mixed with molybdenum disulfide.

The mixed solution thus obtained was transferred to an 80 mL PTFE liner, and then the liner was placed in a reactor and heated in a constant temperature oven. The reaction temperature and time were controlled to 180° C. and 12 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C.

The ultrasonicated suspension was centrifuged as follows. The ultrasonicated suspension was initially centrifuged for 10 min at a low rotation speed of 3000 r/min, to obtain a supernatant. Then, the supernatant was centrifuged for 8 min at a high rotation speed of 10000 r/min, to collect a solid, which was then dried in a vacuum oven at 80° C., to obtain an iron-doped few-layer molybdenum disulfide. As characterized by XRD, TEM, and HAADF-STEM, the material has an ultra-thin and irregular flake-like microstructure with a length and a width that are both 50-200 nm, the thickness of the few-layer ultra-thin and irregular flake is 0.5-3 nm, and the material has 1-4 layers on average over the thickness. Fe on the surface is dispersed in a form of single atoms that mostly exist at a position right above the underlying Mo, that is, a position central to three sulfur atoms on the surface layer, so non-substitute doping occurs.

10 mg of iron-doped few-layer molybdenum disulfide was weighed as a precursor, and ultrasonically dispersed in 1 mL of a mixed solution of Nafion (2 wt %) and isopropanol. Then, 100 μL of the iron-doped few-layer molybdenum disulfide suspension was dripped onto the surface of a glassy carbon electrode with a surface area of 1 cm$^2$, and dried under infrared light, to prepare a Fe-FL-MS/GC electrode having a load of catalyst of 1 mg/cm$^2$.

In an electrolytic cell including an anode tank and a cathode tank separated by a proton exchange membrane, an iron-doped few-layer molybdenum disulfide catalyst electrode was used as a working electrode (cathode), a platinum plate was used as an auxiliary electrode (anode), and a saturated calomel electrode was used as a reference electrode; a 0.1 M potassium sulfate solution was used as an anolyte solution, and a 0.1 M potassium chloride solution was used as a catholyte solution; $N_2$ was introduced into the cathode tank until saturation was reached; and the $N_2$ was then reduced into $NH_4^+$ at a constant potential of –0.16 V while the $N_2$ was introduced continuously, wherein the current efficiency was 11.65%.

Example 4

Electrocatalytic Reduction of $N_2$ with Lanthanum-Doped Few-Layer Molybdenum Disulfide.

At room temperature, 1.236 g of ammonium molybdate tetrahydrate and 1.824 g of thiourea were sequentially added to 50 mL of distilled water and mixed uniformly by stirring for 30 min. The mixed solution was transferred to an 80 mL PTFE liner, and then the liner was placed in a reactor and heated in a constant temperature oven. The reaction temperature and time were controlled to 200° C. and 24 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C., to obtain a flower-ball-shaped molybdenum disulfide.

0.1 g of the flower-ball-shaped molybdenum disulfide was added to 50 ml of distilled water, and an ultrasonic process is performed to the flower-ball-shaped molybdenum disulfide for 20 min to carry out an exfoliation.

Lanthanum nitrate hydrate was added to the solution obtained above, wherein the molar ratio of lanthanum relative to molybdenum disulfide was controlled to 1%. Stirring with a magnetic stirrer was continued for 1 h, such that the lanthanum added was fully mixed with molybdenum disulfide.

The mixed solution thus obtained was transferred to an 80 mL PTFE liner, and then the liner was placed in a reactor and heated in a constant temperature oven. The reaction temperature and time were controlled to 200° C. and 12 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C.

The ultrasonicated suspension was centrifuged as follows. The ultrasonicated suspension was initially centrifuged for 10 min at a low rotation speed of 5000 r/min, to obtain a supernatant. Then, the supernatant was centrifuged for 5 min at a high rotation speed of 15000 r/min, to collect a solid, which was then dried in a vacuum oven at 80° C., to obtain a lanthanum-doped few-layer molybdenum disulfide.

10 mg of lanthanum-doped few-layer molybdenum disulfide was weighed as a precursor, and ultrasonically dispersed in 1 mL of a mixed solution of Nafion (2 wt %) and isopropanol. Then, 150 μL of the lanthanum-doped few-layer molybdenum disulfide suspension was dripped onto the surface of a glassy carbon electrode with a surface area of 1 cm$^2$, and dried under infrared light, to prepare a La-FL-MS/GC electrode having a load of catalyst of 1.5 mg/cm$^2$.

In an electrolytic cell including an anode tank and a cathode tank separated by a proton exchange membrane, a lanthanum-doped few-layer molybdenum disulfide catalyst electrode was used as a working electrode (cathode), a platinum plate was used as an auxiliary electrode (anode), and a saturated calomel electrode was used as a reference electrode; a 0.1 M potassium sulfate solution was used as an anolyte solution, and a 0.1 M potassium chloride solution was used as a catholyte solution; $N_2$ was introduced into the cathode tank until saturation was reached; and the $N_2$ was then reduced into $NH_4^+$ at a constant potential of −0.16 V while the $N_2$ was introduced continuously, wherein the Faradic efficiency was 18.15%.

Example 5

Electrocatalytic Reduction of $N_2$ with Platinum-Doped Few-Layer Molybdenum Disulfide.

At room temperature, 1.236 g of ammonium molybdate tetrahydrate and 1.824 g of thiourea were sequentially added to 50 mL of distilled water and mixed uniformly by stirring for 30 min. The mixed solution was transferred to an 80 mL PTFE liner, and then the liner was placed in a reactor and heated in a constant temperature oven. The reaction temperature and time were controlled to 200° C. and 24 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C., to obtain a flower-ball-shaped molybdenum disulfide.

0.1 g of the flower-ball-shaped molybdenum disulfide was added to 50 ml of distilled water, and an ultrasonic process is performed to the flower-ball-shaped molybdenum disulfide for 20 min to carry out an exfoliation.

Platinum nitrate was added to the solution obtained above, wherein the molar ratio of platinum relative to molybdenum disulfide was controlled to 1%. Stirring with a magnetic stirrer was continued for 1 h, such that the platinum added was fully mixed with molybdenum disulfide.

The mixed solution thus obtained was transferred to an 80 mL PTFE liner, and then the liner was placed in a reactor and heated in a constant temperature oven. The reaction temperature and time were controlled to 200° C. and 12 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C.

The ultrasonicated suspension was centrifuged as follows. The ultrasonicated suspension was initially centrifuged for 10 min at a low rotation speed of 5000 r/min, to obtain a supernatant. Then, the supernatant was centrifuged for 5 min at a high rotation speed of 15000 r/min, to collect a solid, which was then dried in a vacuum oven at 80° C., to obtain a platinum-doped few-layer molybdenum disulfide.

10 mg of platinum-doped few-layer molybdenum disulfide was weighed as a precursor, and ultrasonically dispersed in 1 mL of a mixed solution of Nafion (2 wt %) and isopropanol. 150 μL of the platinum-doped few-layer molybdenum disulfide suspension was dripped onto the surface of a glassy carbon electrode with a surface area of 1 cm$^2$, and dried under infrared light, to prepare a Pt-FL-MS/GC electrode having a load of catalyst of 1.5 mg/cm$^2$.

In an electrolytic cell including an anode tank and a cathode tank separated by a proton exchange membrane, a platinum-doped few-layer molybdenum disulfide catalyst electrode was used as a working electrode (cathode), a platinum plate was used as an auxiliary electrode (anode), and a saturated calomel electrode was used as a reference electrode; a 0.1 M potassium sulfate solution was used as an anolyte solution, and a 0.1 M potassium chloride solution was used as a catholyte solution; $N_2$ was introduced into the cathode tank until saturation was reached; and the $N_2$ was then reduced into $NH_4^+$ at a constant potential of −0.16 V while the $N_2$ was introduced continuously, wherein the Faradic efficiency was 8%.

Example 6

Electrocatalytic Reduction of $N_2$ with Palladium-Doped Few-Layer Molybdenum Disulfide.

At room temperature, 1.236 g of ammonium molybdate tetrahydrate and 1.824 g of thiourea were sequentially added to 50 mL of distilled water and mixed uniformly by stirring for 30 min. The mixed solution was transferred to an 80 mL PTFE liner, and then the liner was placed in a reactor and heated in a constant temperature oven. The reaction temperature and time were controlled to 200° C. and 24 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C., to obtain a flower-ball-shaped molybdenum disulfide.

0.1 g of the flower-ball-shaped molybdenum disulfide was added to 50 ml of distilled water, and an ultrasonic process is performed to the flower-ball-shaped molybdenum disulfide for 20 min to carry out an exfoliation.

Palladium nitrate hydrate was added to the solution obtained above, wherein the molar ratio of palladium relative to molybdenum disulfide was controlled to 1%. Stirring with a magnetic stirrer was continued for 1 h, such that the palladium added was fully mixed with molybdenum disulfide.

The mixed solution thus obtained was transferred to an 80 mL PTFE liner, and then the liner was placed in a reactor and heated in a constant temperature oven. The reaction temperature and time were controlled to 200° C. and 12 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C.

The ultrasonicated suspension was centrifuged as follows. The ultrasonicated suspension was initially centrifuged for 10 min at a low rotation speed of 5000 r/min, to obtain a supernatant. Then, the supernatant was centrifuged for 5 min at a high rotation speed of 15000 r/min, to collect a solid, which was then dried in a vacuum oven at 80° C., to obtain a palladium-doped few-layer molybdenum disulfide.

10 mg of palladium-doped few-layer molybdenum disulfide was weighed as a precursor, and ultrasonically dispersed in 1 mL of a mixed solution of Nafion (2 wt %) and isopropanol. 150 μL of the palladium-doped few-layer molybdenum disulfide suspension was dripped onto the surface of a glassy carbon electrode with a surface area of 1 cm$^2$, and dried under infrared light, to prepare a Pd-FL-MS/GC electrode having a load of catalyst of 1.5 mg/cm$^2$. In an electrolytic cell including an anode tank and a cathode tank separated by a proton exchange membrane, a palladium-doped few-layer molybdenum disulfide catalyst electrode was used as a working electrode (cathode), a platinum plate was used as an auxiliary electrode (anode), and a saturated calomel electrode was used as a reference electrode; a 0.1 M potassium sulfate solution was used as an anolyte solution, and a 0.1 M potassium chloride solution was used as a catholyte solution; $N_2$ was introduced into the cathode tank until saturation was reached; and the $N_2$ was then reduced into $NH_4^+$ at a constant potential of −0.16 V while the $N_2$ was introduced continuously, wherein the Faradic efficiency was 4.35%.

Example 7

Electrocatalytic Reduction of $N_2$ with Ruthenium-Doped Few-Layer Molybdenum Disulfide.

At room temperature, 1.236 g of ammonium molybdate tetrahydrate and 1.824 g of thiourea were sequentially added to 50 mL of distilled water and mixed uniformly by stirring for 30 min. The mixed solution was transferred to an 80 mL PTFE liner, and then the liner was placed in a reactor and heated in a constant temperature oven. The reaction temperature and time were controlled to 200° C. and 24 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C., to obtain a flower-ball-shaped molybdenum disulfide.

0.1 g of the flower-ball-shaped molybdenum disulfide was added to 50 ml of distilled water, and an ultrasonic process is performed to the flower-ball-shaped molybdenum disulfide for 20 min to carry out an exfoliation.

Ruthenium nitrate hydrate was added to the solution obtained above, wherein the molar ratio of ruthenium relative to molybdenum disulfide was controlled to 1%. Stirring with a magnetic stirrer was continued for 1 h, such that the ruthenium added was fully mixed with molybdenum disulfide.

The mixed solution thus obtained was transferred to an 80 mL PTFE liner, and then the liner was placed in a reactor and heated in a constant temperature oven. The reaction temperature and time were controlled to 200° C. and 12 h respectively. After the reaction was completed, the reactor was allowed to naturally cool to room temperature. The solid reaction product was collected by centrifugation, and washed 3 times each with dilute hydrochloric acid, distilled water, and anhydrous ethanol. The washed solid product was collected by centrifugation, and dried in a vacuum oven at 80° C.

The ultrasonicated suspension was centrifuged as follows. The ultrasonicated suspension was initially centrifuged for 10 min at a low rotation speed of 5000 r/min, to obtain a supernatant. Then, the supernatant was centrifuged for 5 min at a high rotation speed of 15000 r/min, to collect a solid, which was then dried in a vacuum oven at 80° C., to obtain a ruthenium-doped few-layer molybdenum disulfide.

10 mg of ruthenium-doped few-layer molybdenum disulfide was weighed as a precursor, and ultrasonically dispersed in 1 mL of a mixed solution of Nafion (2 wt %) and isopropanol. 150 μL of the ruthenium-doped few-layer molybdenum disulfide suspension was dripped onto the surface of a glassy carbon electrode with a surface area of 1 cm$^2$, and dried under infrared light, to prepare a Ru-FL-MS/GC electrode having a load of catalyst of 1.5 mg/cm$^2$.

In an electrolytic cell including an anode tank and a cathode tank separated by a proton exchange membrane, a ruthenium-doped few-layer molybdenum disulfide catalyst electrode was used as a working electrode (cathode), a platinum plate was used as an auxiliary electrode (anode), and a saturated calomel electrode was used as a reference electrode; a 0.1 M potassium sulfate solution was used as an anolyte solution, and a 0.1 M potassium chloride solution was used as a catholyte solution; $N_2$ was introduced into the cathode tank until saturation was reached; and the $N_2$ was then reduced into $NH_4^+$ at a constant potential of −0.16 V while the $N_2$ was introduced continuously, wherein the Faradic efficiency was 0.75%.

What is claimed is:

1. A monatomic metal-doped few-layer molybdenum disulfide electrocatalytic material, which has a few-layer ultra-thin and irregular flake-like microstructure with a length and a width of nanometer scale, and wherein the doping metal in the monatomic metal-doped few-layer molybdenum disulfide electrocatalytic material is dispersed in a form of single atoms.

2. The monatomic metal-doped few-layer molybdenum disulfide electrocatalytic material according to claim 1, wherein the monatomic metal in the monatomic metal-doped few-layer molybdenum disulfide electrocatalytic material is for non-substitute doping, and the few-layer ultra-thin and irregular flake has a length and width of 50-200 nm, a thickness of 0.5-3 nm and 1-4 layers on average.

3. The monatomic metal-doped few-layer molybdenum disulfide electrocatalytic material according to claim 1, wherein the monatomic metal comprises iron, ruthenium, platinum, palladium, and lanthanum, and a doped amount is 0.2%-3%.

4. A method for preparing the monatomic metal-doped few-layer molybdenum disulfide electrocatalytic material according to claim 1, comprising the following steps:
 1) performing an ultrasonic process to flower-ball-shaped molybdenum disulfide to carry out an exfoliation, to obtain a few-layer molybdenum disulfide solution;
 2) adding a nitrate hydrate of the metal to be doped to the few-layer molybdenum disulfide solution, mixing the few-layer molybdenum disulfide solution and the nitrate hydrate fully and uniformly by stirring, hydrothermally reacting for 10-12 h at 180-220° C., naturally cooling a reactor to room temperature after the reaction is completed, carrying out a post-treatment, and collecting a reaction product; and
 3) ultrasonicating, centrifuging, and drying the reaction product to obtain a monatomic metal-doped few-layer molybdenum disulfide.

5. The method according to claim 4, wherein in the step 2), a molar ratio of the nitrate hydrate of the metal to be doped, based on the metal to be doped, relative to molybdenum disulfide is 0.5%-5%.

6. The method according to claim 4, wherein an ultrasonication time in the step 1) is 15-20 min, and the centrifuging in the step 3) comprises: centrifuging for 5-10 min at a low rotation speed of 3000-5000 r/min to collect a supernatant; and centrifuging the supernatant for 5-10 min at a high rotation speed of 10000-15000 r/min.

7. A method of using the monatomic metal-doped few-layer molybdenum disulfide electrocatalytic material according to claim 1, comprising:
 in an electrolytic cell comprising an anode tank and a cathode tank separated by a proton exchange membrane, using a monatomic metal-doped few-layer molybdenum disulfide electrocatalytic material electrode as a working electrode, using a platinum plate as an auxiliary electrode, and using a saturated calomel electrode as a reference electrode;
 respectively charging an anolyte solution and a catholyte solution to the electrolytic cells of the anode tank and the cathode tank;
 introducing $N_2$ into the cathode tank until saturation; and then reducing the $N_2$ at a constant potential of −0.36-0.04 V while introducing the $N_2$ continuously.

8. The method according to claim 7, wherein the anolyte solution is a 0.05-0.2 M potassium sulfate solution, and the catholyte solution is a 0.05-0.2 M potassium chloride solution.

9. The method according to claim 7, wherein a load of the electrocatalytic material in the monatomic metal-doped few-layer molybdenum disulfide electrocatalytic material electrode is 1-2 mg/cm$^2$.

\* \* \* \* \*